United States Patent [19]

Scantlin

[11] 3,819,910

[45] June 25, 1974

[54] OPTICAL CARD READING SYSTEM

[75] Inventor: John R. Scantlin, Los Angeles, Calif.

[73] Assignee: Transaction Technology Inc., Los Angeles, Calif.

[22] Filed: July 31, 1972

[21] Appl. No.: 276,768

[52] U.S. Cl. .................... 235/61.11 E, 250/219 DC
[51] Int. Cl. .................................... G06k 7/14
[58] Field of Search ....... 235/61.11 E; 250/219 DC, 250/217 SS, 211 J

[56] References Cited

UNITED STATES PATENTS

| | | | |
|---|---|---|---|
| 3,086,121 | 4/1963 | Cockrell | 235/61.11 E |
| 3,088,665 | 5/1963 | Branscomb et al. | 235/61.11 E |
| 3,443,109 | 5/1969 | Broom et al. | 235/61.11 E |
| 3,524,047 | 8/1970 | Gorder et al. | 235/61.11 E |
| 3,542,286 | 11/1970 | Binkley et al. | 235/61.11 E |
| 3,627,990 | 12/1971 | Sallach | 235/61.11 E |

*Primary Examiner*—Paul J. Henon
*Assistant Examiner*—Joseph M. Thesz, Jr.
*Attorney, Agent, or Firm*—Smyth, Roston & Pavitt

[57] ABSTRACT

An optical card reading system for reproducing coded information contained on a plurality of tracks on a card and with the information formed as discrete areas having a transmissivity different than an adjacent area while the entire card appears opaque to the naked eye and with the reading system including a plurality of light sources positioned to one side of the card and corresponding in number to the number of information tracks on the card and with a plurality of light-sensitive elements each of which produces an output signal in response to light energy passing through the card from the light source and with the light-sensitive elements corresponding in number to the number of light sources and with the individual light sources activated in sequence to direct light energy toward the card and with any output signals from the light-sensitive elements also gated in sequence to correspond to the corresponding light source so as to reduce spurious output signals. The card reading system also includes the light sources being energized in sequence to further reduce spurious output signals. The invention also includes the use of additional light sources and light-sensitive elements to read out additional information such as clocking information or information detecting the presence of the card at various positions.

21 Claims, 5 Drawing Figures

PATENTED JUN 25 1974

3,819,910

SHEET 1 OF 3

OPTICAL CARD READING SYSTEM

Figure 1:
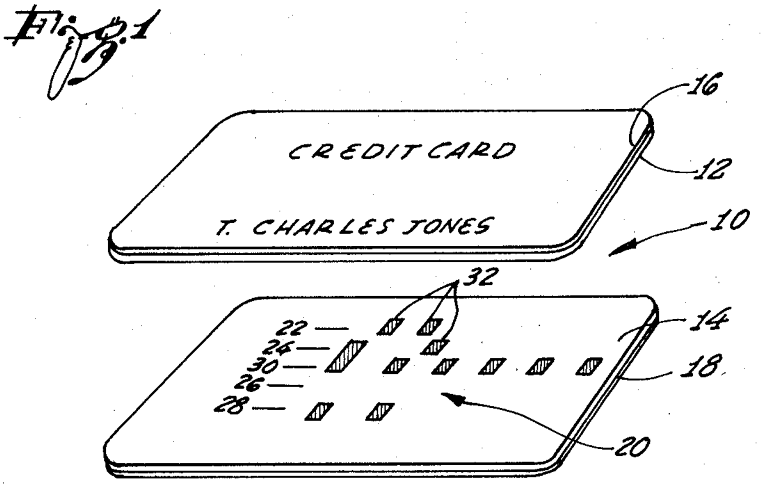

The present invention is directed to an optical card reading system for reproducing coded information contained in a plurality of tracks on a card such as a credit card. It has been proposed that information may be stored on a credit card, which information would represent an identifying number corresponding to a particular individual and with this card automatically read by a card reader. The information would be transmitted to a central computer having a data bank and with the computer sending a returning message to the card reader in accordance with information in the data bank to indicate whether credit should be extended or refused. This type of card may be characterized as a credit card for use with an automatic credit authorization system.

For example, a customer, when purchasing an item in a store, could make payment for the purchase using a credit card which would generally be similar in outward appearance to the credit cards now in use. The sales person would receive from the purchaser this credit card which contains hidden coded information representing an account number individual to the purchaser. It has been proposed, for example, that such information may be stored on the back of the card using a magnetic stripe and with the information relating to the account number magnetically recorded on this stripe. Such a method of storing information presents problems since such magnetic storage may be easily duplicated or changed, thus leading to fraudulent use of the credit card.

The present invention is for use with a credit card wherein the information is stored optically along a plurality of tracks and wherein discrete areas along the tracks have a transmissivity different than an adjacent area. In order to insure that this optical encoding cannot easily be changed and is not even known to the user of the credit card; the optical information is encoded within the card and the card appears to be opaque to the human eye. A clearer understanding of the card and its construction will be had with reference to copending applications, Ser. No. 223,272 filed Feb. 3, 1972, and Ser. No. 242,382, filed Apr. 10, 1972, both listing John R. Scantlin as the inventor and both assigned to the same assignee as the instant application.

In a typical transaction, the salesperson would insert the credit card including the optically encoded information in a card reader and with the card reader reading out this encoded information and transmitting the encoded information to a central computer with a data bank. This central computer interprets the information optically encoded on the card, which, for example, may be an account number, and determines in accordance with the information in the data bank whether the account with that number should be extended credit. For example, the salesperson may also manually insert the purchase price so that the authorization of credit would be for a particular amount. In addition, the system may ultimately be tied into the customer's checking account to provide for the automatic withdrawal of an amount equal to the purchase price from the checking account so that the actual payment would also be handled automatically.

In either of the above cases, the salesperson has to know whether credit is to be extended or whether the account contains sufficient funds to cover the purchase. This information is transmitted back to the card reading terminal and displayed for the salesperson. The coding system used to encode information on the card and wherein the coding system contains a clock track to provide self-clocking of the information, may be of the type disclosed in copending application, Ser. No. 242,382, filed Apr. 10, 1972, listing John R. Scantlin as the inventor and assigned to the same assignee as the instant application.

It is to be appreciated that the information may either be contained in the form of openings through an inner layer of low transmissivity or may consist of low transmissivity areas at a position within the card. Both of these above-described types of cards are more fully disclosed in the above-referenced copending applications, Ser. Nos. 223,272 and 242,382.

The present invention will be described with reference to information tracks where the information is contained in discrete areas having a transmissivity lower than the adjacent area. In order to read these discrete areas which are located in parallel tracks and are relatively close to each other, it is necessary to use a fairly small light source to direct light energy toward the individual tracks on the card. For example, at least one light source would be used for each track of information. The clock track would use a pair of light sources so as to provide self-clocking signals, which is described in copending application, Ser. No. 242,382 referred to above.

Since the light sources are located close together and must be relatively small, the present invention uses light-emitting diodes as the light sources. Since the credit card is opaque to the human eye, the light sources must emit sufficient light energy in order to penetrate through the credit card in those areas which are not designed to stop the passage of light energy. If a steady current is supplied to the light sources, such as the light-emitting diodes, to provide this high-intensity light energy the diodes would overheat and would quickly fail.

It was therefore determined that the light-emitting diodes be supplied with current pulses for a short duration. In addition, the light-emitting diodes are pulsed in sequence so that each diode is pulsed at least once during a complete reading cycle. This provides for a low duty cycle in the current supply to each diode. In this way, each light-emitting diode will emit light energy which is sufficient to penetrate the credit card and to pass through the card in those areas which do not contain the low transmissivity areas, but with the current supplied to each diode for a relatively short period of time and with a relatively low duty cycle. The low duty cycle and relatively short pulse duration results in operation within the temperature and power limitation of the light-emitting diodes and with a low power requirement for the light-emitting diodes. In addition, the pulsing of the light sources occurs only when the card is entering the reader, thus insuring long life for the power sources.

Positioned on the other side of the credit card are a plurality of light-sensitive elements which correspond in number to the light-emitting diodes. Each light-sensitive element is in line with a complementary one of the light-emitting diodes. When any one of the light-emitting diodes is energized and when the light from the light-emitting diode passes through the credit card due to the absence of a low transmissivity area, the complementary light-sensitive element will detect the light energy.

In order to insure that an output signal is produced only from the complementary light-sensitive element, the output signals from the light-sensitive elements are gated simultaneously with the activation of the individual complementary light sources. In this way, spurious signals from adjacent light-sensitive elements are eliminated and only output signals from light-sensitive elements corresponding to the particular light source energized are passed to the output circuit. The light-sensitive elements may be a phototransistor which is similar in physical size to the light-emitting diodes. It is to be appreciated that the encoded card may also be a bank card for use in facilitating various banking operations such as check cashing, balance inquiry, etc.

Figure 2A:
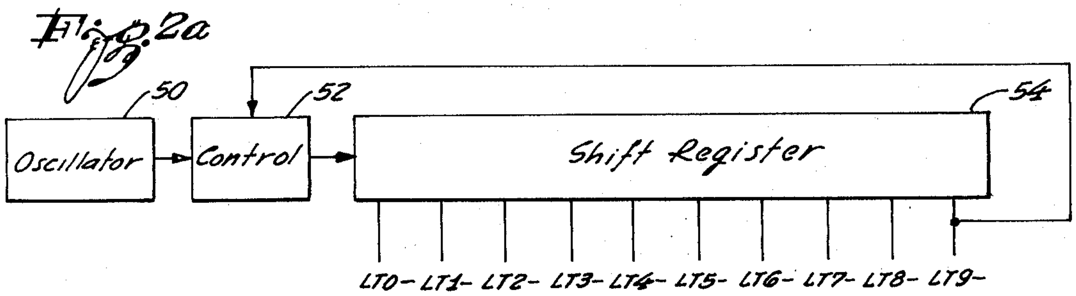
Figure 2B:
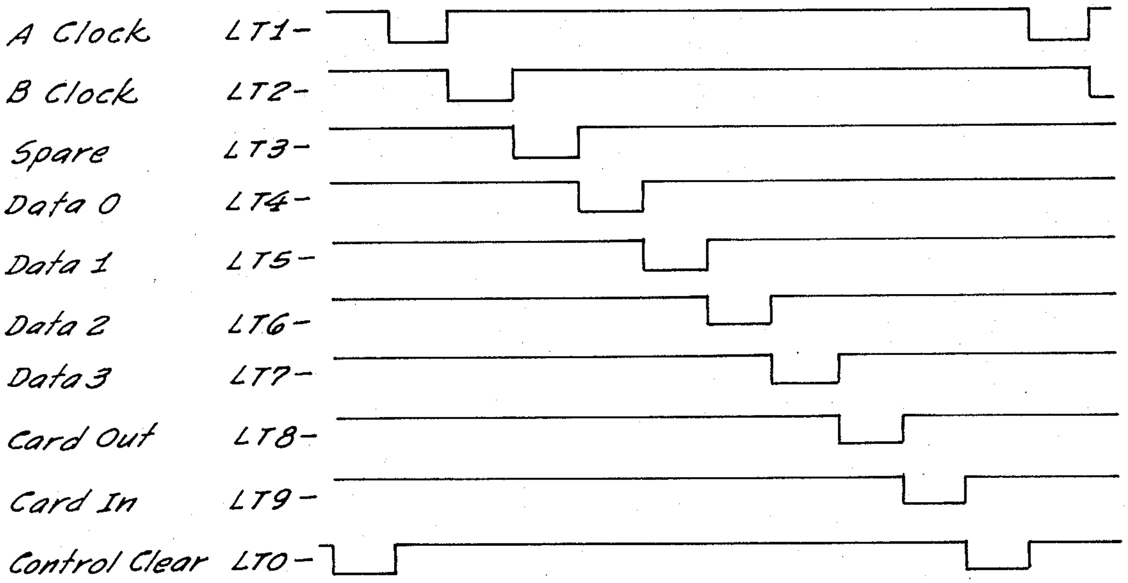

A clearer understanding of the invention will be had with reference to the following description and drawings wherein:

FIG. 1 illustrates an optically encoded card which may be used with the card reading system of the present invention;

FIG. 2*a* illustrates a block diagram of a timing system used for providing timing signals;

FIG. 2*b* illustrates the timing pulses as they are produced in succession by the timing system of FIG. 2*a;*

Figure 3:
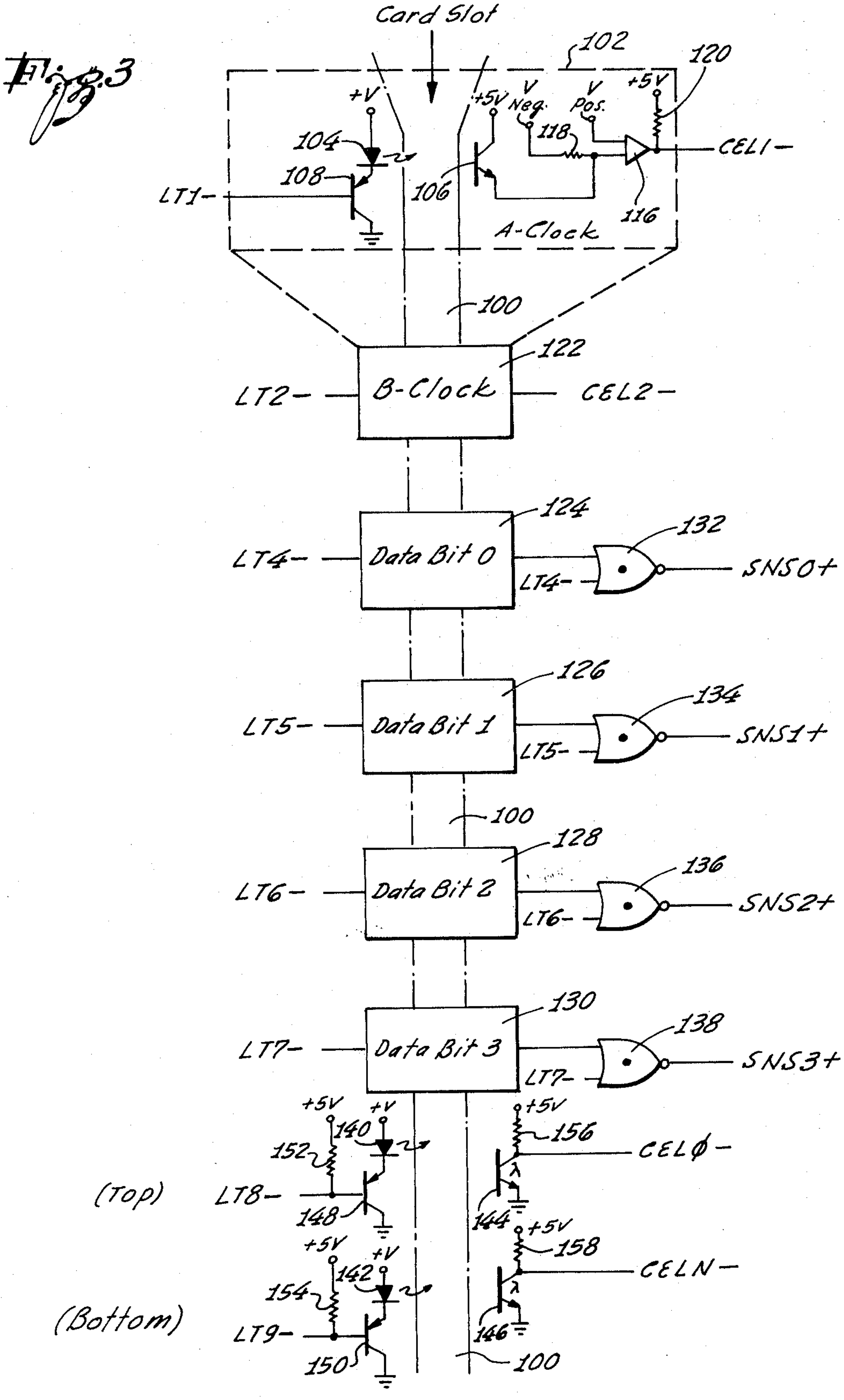
Figure 4:
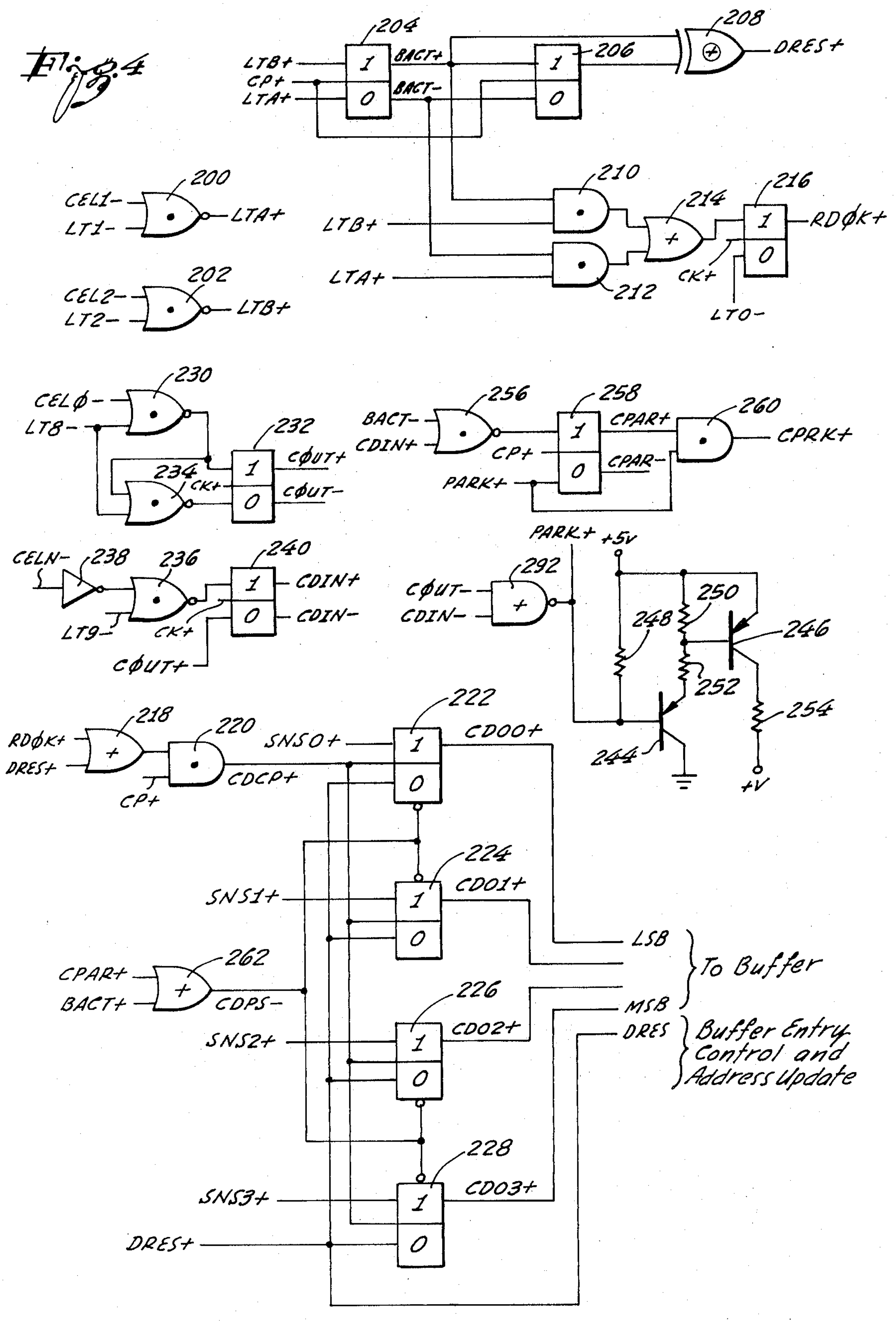

FIG. 3 illustrates a diagram partially in schematic form and partially in block form illustrating the plurality of light emitting diodes and light-sensitive elements used to provide output signals representing the information of tracks, the clock track and the presence of the credit card in a top position and a bottom position of the card reader; and FIG. 4 illustrates a logic diagram of the remaining portion of the card reading system for providing control of the energization of the light-emitting diodes and the provision of output signals from the light sensitive elements.

In FIG. 1, an optically encoded card 10, which may be used with the card reading system of the present invention, is shown. Although the card 10 is shown to be constructed in a particular manner, it is to be appreciated that the card 10 may take other forms, such as those described in copending application, Ser. Nos. 223,272 and 242,382 referred to above, and the particular card shown in FIG. 1 is illustrative only.

The card 10 is constructed of four layers of material including two inner layers 12 and 14 and two outer layers 16 and 18. The inner layers 12 and 14 have a transmissivity which is low enough so as to appear opaque to the human eye. The layers 16 and 18 have a high transmissivity and are transparent to the human eye. The layers 12 and 14 may have printing on their outer surfaces which would generally be the type of printing appearing on existing credit cards. The card 10 would, therefore, appear to the naked eye to be a normal credit card.

The layer 14 may have an additional low transmissivity printing on the inner surface, as shown by area 20, including discrete portions 32. It can be seen that this low transmissivity printing consists of four tracks of information 22, 24, 26 and 28 and a center track 30 which is a clock track. The method of coding and the manner in which the clock track 30 may be used to provide for a self-clocking of the information as it is read from the card 10 is described in copending application, Ser. No. 242,382 referred to above.

It is to be appreciated that other coding methods may be used with the card reading system of the present invention. It is also to be appreciated that the area 20 may be printed on the inner surface of the layer 12 and whereby this information appears on the inner surface of the layer 12 or the layer 14, or is shared between these inner surfaces, forms no part of the present invention. Also, the manner in which the card may be constructed is described in copending application, Ser. No. 242,382, referred to above.

Generally, the inner layers 12 and 14 and the outer layers 16 and 18 are laminated together to form a unitary card 10 and with the coded area 20 located at an internal position within the card. The coded area is not visible since the layers 12 and 14 are opaque to the human eye. It can be seen that the discrete portions 32 representing information, which discrete portions are very dense and which will severely attenuate the passage of light energy through the card 10. The areas of the card 10 other than those which contain the discrete portions 32 will allow the passage of light energy if that light energy is sufficiently intense to pass through the layers 12 and 14.

It is to be appreciated that the size of the card is relatively small and the tracks of information and the clock track are relatively close together so that the light sources for reading these tracks must be relatively small in size. It has been found that light-emitting diodes are sufficiently small in size so that they may be positioned adjacent to each other so as to direct light energy to the tracks of information and the clock track.

In order to eliminate spurious output signals, the light-emitting diodes are energized sequentially so that only one light-emitting diode is energized at a time.

Light-sensitive elements are positioned on the other side of the card to receive any light energy passing through the card and with one light-sensitive element associated with each light-emitting diode. Also, to insure that there are no spurious output signals, the output signal from each light-sensitive element is gated with the pulsing of the appropriate light-emitting diode so that only light energy passing through the card 10 to a corresponding light-sensitive element is used to provide an output signal. These spurious output signals could be caused by light scattering through the card from one light source to a light-sensitive element of an adjacent light source.

FIG. 2*a* and 2*b* illustrate a block diagram of a timing system to provide for timing signals to control the energization of the light-emitting diodes and the gating of the output signals from the light-sensitive elements and FIG. 2*b* illustrates the particular timing signals as they occur in time sequence It can be seen in FIG. 2*a* that an oscillator 50 provides for an output signal of a particular frequency. This output signal is applied to a control circuit 52 which controls the frequency of the signal from the oscillator 50 as applied to a shift register 54. The shift register 54 provides for a plurality of sequential pulse outputs, ten in number, which are referred to as LT0— to LT9—. The last pulse signal LT9— is used as a feedback signal to the control circuit 52 to provide for the input of a single one into the shift register.

The pulse signals LT0− to LT9− are shown in FIG. 2*b* and, in addition, the associated functions for these various pulse signals are shown to the left of the designations LT0− to LT9−. Specifically, LT1− and LT2− are used to control the A and B clock signals. LT3− is a spare. LT4− to LT7− are used to control the reception of data from data tracks 0, 1, 2 and 3 which correspond to the tracks 22, 24, 26 and 28 shown in FIG. 1. Finally, LT8− and LT9− control the reading of the Card Out and Card In positions. All of the pulse signals LT0− to LT9− have a pulsewidth of 104 microseconds and are part of a complete cycle of 1.04 milliseconds so that the timing signals LT0− to LT9− have a relatively short pulsewidth and a duty cycle of 10 percent. It is to be appreciated that these specific values for the pulsewidth and duty cycle are illustrative only, but it is to be appreciated that in order to conserve power and to insure that the light-emitting diodes do not overheat, it is desirable to provide for timing signals having a short pulsewidth and a low duty cycle.

FIG. 3 illustrates the plurality of the light-emitting diodes and phototransistors positioned to provide output signals representing the information, the clock signal and the Card Out and Card In positions. Typically, a card slot 100 is used to receive a card 10 as shown in FIG. 1 and with the card passing the various light-emitting diodes and light-sensitive elements from the top position of the card to the bottom position of the card. Copending application, Ser. No. 242,382 referred to above discloses the structure of the card reader and the position of the various light sources and light sensitive elements.

A typical light coupler for transmitting light from the light-emitting diode to the phototransistor is shown within dotted block 102 and specifically is for the sensing of the A clock signal. The sensing of the B clock signal and the data bits 0, 1, 2 and 3 would include similar circuits as shown within dotted block 102. The typical light coupler includes a light-emitting diode 104 and a phototransistor 106. The light-emitting diode may be, for example, a type TIL 24 light-emitting diode manufactured by Texas Instruments and generally referred to as a "gallium arsenide" type of light-emitting diode. The phototransistor may be of the type TIL S 600 phototransistor manufactured by Texas Instruments and is a silicon phototransistor. The spectral response of the phototransistor generally matches the spectral output of the light-emitting diode so as to provide for a maximum efficiency in the transfer of light energy from the light-emitting diodes to the phototransistors.

The activation of the light-emitting diode 104 is controlled by a transistor 108. The transistor 108 has the timing signal LT1− coupled to its base to control the operation of the transistor. The transistor 108 is turned on when receiving the timing signal LT1− to allow for the activation of the light-emitting diode 104. The light-emitting diode 104 is activated for a period of time as controlled by the timing pulse LT1−. The light output from the light-emitting diode is sufficiently high to pass through the card 10, except in those discrete portions 32 which represent either information or a clock signal, although the card is opaque to the human eye under normal illumination.

The phototransistor 106 when receiving light energy produces an output signal which is coupled to an integrated circuit amplifier 116. The amplifier 116 also receives as biasing inputs a positive voltage signal and a negative voltage signal through a resistor 118. The output from the amplifier 116 is taken across a resistor 120 and appears as the A clock signal CEL1−. In a similar fashion, the B clock signal referred to as CEL2− is produced and is controlled by the timing signal LT2−. The block 122, therefore, represents the production of the B clock signal CEL2−. These output signals CEL1− and CEL2− are gated with the timing signals LT1− and LT2− as shown in FIG. 4 to eliminate the production of spurious signals.

The detection of the information in the data tracks referred to as data bit 0 through data bit 3 is provided for by light couplers 124, 126, 128 and 130 which are substantially identical to the light coupler 102 and with the light-emitting diodes contained within these couplers controlled in accordance with the timing signals LT4− to LT7−. In addition to the control of the light-emitting diodes within the light couplers 124 to 130, the outputs from the phototransistor amplifiers contained within the light couplers 124 to 130 are gated with the timing signals LT4− to LT7− so as to minimize the detection of erroneous signals. Specifically, gates 132 through 138 are used to gate the outputs from the phototransistor amplifiers to provide the data signals SNS0+, SNS1+, SNS2+ and SNS3+ so that output signals from a phototransistor are passed only when the corresponding light-emitting diode is energized by the same timing signal. This reduces the possibility of detecting reflected light from other light sources and interpreting it as data.

In addition to the detection of the information contained in the discrete portions 32, which constitutes the area 20 of the credit card 10, it is also desirable to detect the presence of the card in the card reader from the top position to the bottom position of the card reader. This is accomplished using an additional pair of light-emitting diodes 140 and 142 and a pair of light-sensitive elements such as phototransistors 144 and 146. The activation current for the light-emitting diodes 140 and 142 is relatively low compared to the activation current used for the light-emitting diodes contained within the couplers 102 and 122–130. The intensity of the light output from the diodes 140 and 142 is not sufficient to penetrate the card 10. The card itself is, therefore, used as the element which is detected by the light-emitting diodes 140 and 142 and phototransistors 144 and 146.

The light-emitting diode 140 and light emitting diode 142 are controlled by transistors 148 and 150 to operate only upon the appearance of the timing signals LT8− and LT9−. The transistors 148 and 150 have their bases biased by a positive voltage applied through resistors 152 and 154. The output signals from the phototransistors 144 and 146 are taken across resistors 156 and 158 and are designated as CELO− and CELN−. It can be seen from FIG. 3 that all of the output signals CEL1−, CEL2−, SNS0+, SNS1+, SNS2+, SNS3+, CELO− and CELN− are controlled in accordance with timing signals applied to control the activation of light-emitting diodes. In addition, the output signals SNS0+, SNS1+, SNS2+ and SNS3+ are also gated with the same timing signals used to gate the corresponding light-emitting diode so as to minimize any detection of spurious output signals which would therefore represent erroneous data. In addition, as shown in FIG. 4, the output signals CEL1−, CEL2−, CELO− and CELN− are also gated by the appropriate timing signals LT1−, LT2−, LT8− and LT9−.

FIG. 4 illustrates a logic diagram of the remaining portion of the system for activating the reproduction of and handling the information in the tracks on the credit card 10 in the area 20. In FIG. 4, as in FIG. 3, certain logic designations contain either a dot "·" or a plus "+" or a plus in a circle "⊕" In addition, at the output of the logic symbol sometimes a circle "0" is added. These designations have the following meanings: The circle "0" represents an inversion of the output signal from the gate; the dot "·" represents that the gate is being used to provide an AND function; the plus "+" represents that the gate is being used to provide an inclusive OR function; and the plus in a circle "⊕" represents that the gate is being used to provide an exclusive OR function. For example, the gates 132, 134, 136 and 138 shown in FIG. 3 are all inverted OR gates or, as more commonly known, NOR gates, and are used to provide an AND function.

In FIG. 4, a pair of NOR gates 200 and 202 receive as input signals the timing signals LT1− and LT2− and the output signals CEL1− and CEL2− which represent the A and B clock signals so that the output signals LTA+ and LTB+ represent the A and B clock signals. The LTA+ and LTB+ signals are applied as two inputs to a flip-flop 204, which may be of the J-K master slave type of flip-flop which also includes a clock input. The outputs BACT+ and BACT− from the flip-flop 204 are applied as inputs to a second flip-flop 206. The BACT+ signal and an output signal from the flip-flop 206 are applied to an exclusive OR gate 208, the output of which is the DRES+ signal. The DRES+ signal represents the proper sequencing of the clock signal between the A and B sensors so as to provide for self clocking, all of which is described in copending application, Ser. No. 242,382.

The LTA+ and LTB+ signals are also applied to a pair of AND gates 210 and 212 along with the BACT− and BACT+ signals from the flip-flop 204. The outputs of the AND gates 210 and 212 are applied to an OR gate 214, the output of which is one input to a flip-flop 216. The other input to the flip-flop 216, in addition to a clock signal, is the timing signal LTO+ which represents a control clear condition. The output from the flip-flop 216 is the RDOK+ signal which is applied along with the DRES+ signal to an OR gate 218. The output from the OR gate 218 is applied as one input to an AND gate 220 along with a clock signal and the output from the AND gate 220 is used to clock a plurality of flip-flops 222, 224, 226 and 228, all of which are used to produce output signals representing data information.

When the card 10 is initially inserted into the card reader, the CELO− signal is produced, as shown in FIG. 3, and this signal is applied as one input to a NOR gate 230. The timing signal LT8− is also applied to the NOR gate 230. The output from the NOR gate 230 is applied as one input to a flip-flop 232 and a second input to the flip-flop comes from a second NOR gate 234 which has as its inputs the output from the NOR gate 230 and the timing signal LT8−. When the card reaches the bottom of the card reader, the second position signal CELN− is produced and this signal is applied to a NOR gate 236 through an inverter 238. The timing signal LT9− is also applied to the NOR gate 236.

The output from the NOR gate 236 is applied as one input to a flip-flop 240 and with the second input to the flip-flop 240 being the COUT+ signal from the flip-flop 232. The output signals COUT− and CDIN− which are from the flip-flops 232 and 240 are applied to a NAND gate 242 to produce the PARK+ signal. This signal indicates the card presence in the reader between the top and bottom position and is used to enable the pulsing of the light-emitting diodes for reading the A and B clock signals and the data bits at positions 0, 1, 2 and 3. This enabling is provided by applying the PARK+ signal to a first transistor 244 and with the output of this transistor controlling a second transistor 246. Resistors 248, 250 and 252 provide for biasing from a 5-volt source. When the PARK+ signal is present, then transistor 244 conducts causing transistor 246 to also conduct. Voltage is then provided through current-limiting resistor 254 which voltage is used to energize the light-emitting diodes used in reading the data and clock information contained within the card 10 shown in FIG. 1.

The CDIN+ signal from the flip-flop 240 is used along with the BACT− signal as the inputs to a NOR gate 256. The output of the NOR gate 256 is used as one input to a flip-flop 258 and the PARK+ signal is used as a second input to the flip-flop 258 along with a clock signal. The CPAR+ signal which is one output from the flip-flop 258 is used as one input to an AND gate 260 and with a second input to the AND gate 260 being the PARK+ signal. The output from the AND gate 260 is designated as CPRK+ and indicates that the card has reached the bottom position and that information has been automatically read. This CPRK+ signal may be used to control the card reader to not accept any further information until the control computer provides a response based on the data which was just read.

The CPAR+ signal from the flip-flop 258 is used along with the BACT+ signal as the two inputs to an OR gate 262. The output from the OR gate 262 is used to control the clearing of the flip-flops 222 to 228. The inputs to these flip-flops are the data signals SNS0+, SNS1+, SNS2+ and SNS3+ along with the DRES+ signal which is used as a reset to all of the flip-flops 222 to 228. The output from the flip-flops 222 to 228 are designated as CDO0+, CDO1+, CDO2+ and CDO3+ and with these signals representing the information to be sent to a buffer register for storage and for transmittal to the control computer.

It can be seen from the above description that the present invention provided for the reading of information from a credit card which is normally opaque to the human eye, but which contains information coded within and provides for a plurality of light-emitting diodes to be energized sequentially so as to provide for the reading of the information. The invention also includes the use of light-emitting diodes to read out clock information and information relating to the position of the card within the card reader. The output information relating to the data is also gated with timing signals so that the detection of erroneous output signals is minimized. In addition, the output signals representing the clock and the position of the card are also gated with the same timing signals used to enable the corresponding light-emitting diodes so that all of the output signals representing position, data and clock information come from light-sensitive elements which correspond to specific light sources.

Although the invention has been described with reference to a particular application, it is to be appreciated that other adaptations and modifications may be made and the invention is only to be limited by the appended claims.

I claim:

1. An optical card reading system for reproducing coded information contained in a plurality of sequential positions along a plurality of tracks on a card and with the information formed as discrete areas having a transmissivity different than an adjacent area, including a plurality of individual light sources positioned adjacent to and on one side of the card and corresponding in number to the plurality of tracks of information on the card to individually direct light energy toward the tracks on the card sequentially across the plurality of tracks, a plurality of individual light-sensitive elements for producing output signals in response to light energy passing through the card and with the elements positioned adjacent to and on the other side of the card and corresponding in number to the plurality of light sources and with the individual light sources and individual light-sensitive elements positioned in complementary pairs, a plurality of first means individually coupled to the light sources for activating the light sources individually in sequence for directing the light energy toward the card sequentially across the plurality of tracks at each sequential position along the plurality of tracks to have complementary ones of the light-sensitive elements receive the light energy and with such reception in accordance with the discrete areas, and a plurality of second means individually coupled to the light-sensitive elements for controlling the passing of output signals from the light-sensitive elements individually in sequence and with pairs of the first and second means coupled to complementary pairs of the light sources and light-sensitive elements and with each pair of first and second means operated simultaneously.

2. The optical card reading system of claim 1 wherein a sequential timing signal is provided to control the operation of the first and second means.

3. The optical card reading system of claim 1 including two additional pairs of light sources and light-sensitive elements to detect top and bottom positions of the card within the card reading system.

4. The optical card reading system of claim 3 including additional first means and second means coupled to the additional light sources and light-sensitive elements to simultaneously control the activation of the light sources and passage of output signals from the light-sensitive elements.

5. The optical card reading system of claim 3 including means to control the activation of the plurality of individual light sources corresponding to the plurality of tracks only when the card is between the top and bottom positions.

6. The optical card reading system of claim 1 wherein the light sources are light-emitting diodes and the light-sensitive elements are phototransistors.

7. The optical card reading system of claim 1 wherein the card includes a track having clock information and including at least one additional pair of a light source and a light-sensitive element for reproducing the clock information.

8. The optical card reading system of claim 7 including at least additional first and second means coupled to the additional light source and light-sensitive element to simultaneously control the activation of the light source and passage of output signals from the light-sensitive element.

9. An optical card reading system for reproducing coded information contained in a plurality of sequential positions along a plurality of tracks on a card and with the information formed as discrete areas having a transmissivity different than an adjacent area, including a plurality of individual light-emitting diodes positioned adjacent to and on one side of the card and corresponding in number to the plurality of tracks of information on the card to direct light energy toward the tracks on the card sequentially across the plurality of tracks, a plurality of individual phototransistors for producing output signals in response to light energy passing through the card and in accordance with the discrete areas and with the phototransistors positioned adjacent to and on the other side of the card and corresponding in number to the plurality of individual light-emitting diodes and with the individual light-emitting diodes and phototransistors positioned in complementary pairs, and means coupled to the light-emitting diodes and the phototransistors for simultaneously activating in sequence across the plurality of tracks at each sequential position along the plurality of tracks the light sources and for gating in the same sequence the output signals from the phototransistors.

10. The optical card reading system of claim 9 wherein a sequential timing signal is provided to control the means coupled to the light-emitting diodes and the phototransistors.

11. The optical card reading system of claim 9 including two additional pairs of light-emitting diodes and phototransistors to detect top and bottom positions of the card within the card reading system.

12. The optical card reading system of claim 11 including additional means coupled to the additional light-emitting diodes and phototransistors to simultaneously control the activation of the light-emitting diodes and passage of output signals from the phototransistors.

13. The optical card reading system of claim 11 including means to control the activation of the plurality of individual light-emitting diodes corresponding to the plurality of tracks only when the card is between the top and bottom positions.

14. The optical card reading system of claim 9 wherein the light-emitting diodes are Gallium Arsenide light-emitting diodes and the phototransistors are silicon phototransistors.

15. The optical card reading system of claim 9 wherein the card includes a track having clock information and including at least one additional pair of a light-emitting diode and a phototransistor for reproducing the clock information.

16. The optical card reading system of claim 15 including additional means coupled to the additional light-emitting diode and phototransistor to simultaneously control the activation of the light-emitting diode and passage of output signals from the phototransistor.

17. A method of reproducing coded information contained in a plurality of sequential positions along a plurality of tracks on a card and with the information formed as discrete areas having a transmissivity different than an adjacent area, including the following steps, providing a plurality of individual light sources adjacent to and on one side of the card and corresponding in number to the plurality of tracks of information on the card, pulsing the individual light sources in sequence to direct light energy toward the tracks on the card across the plurality of tracks at each sequential position along the tracks, providing a plurality of complementary light-sensitive elements adjacent to and on the other side of the card and corresponding in number to the plurality of light sources for producing output signals in response to light energy passing through the card and in accordance with the discrete areas, and controlling the passage of the output signals from the light-sensitive elements in sequence with the pulsing of the complementary light sources.

18. The method of claim 17 additionally providing a sequential timing signal to control the pulsing of the light sources and the passage of the output signals.

19. The method of claim 17 additionally providing two additional pairs of light sources and light-sensitive elements and detecting top and bottom positions of the card within the card reading system with the additional pairs.

20. The method of claim 19 including the step of controlling the pulsing of the light sources only when the card is detected between the top and bottom positions.

21. The method of claim 17 wherein the card includes a track having clock information and additionally providing at least one additional pair of a light source and a light-sensitive element and reproducing the clock information with the additional pairs.

* * * * *